United States Patent [19]
Norton

[11] Patent Number: 5,903,060
[45] Date of Patent: May 11, 1999

[54] SMALL HEAT AND ELECTRICITY GENERATING PLANT

[76] Inventor: Peter Norton, P.O. Box 62, Northville, Mich. 48167

[21] Appl. No.: 08/464,392
[22] Filed: Jun. 5, 1995

Related U.S. Application Data

[63] Continuation-in-part of application No. 08/355,113, Dec. 13, 1994, abandoned, which is a continuation of application No. 08/121,371, Sep. 14, 1993, abandoned, which is a continuation of application No. 07/773,345, Oct. 7, 1991, abandoned, which is a continuation-in-part of application No. 07/529,704, May 25, 1990, abandoned, which is a continuation of application No. 07/218,863, Jul. 14, 1988, abandoned.

[51] Int. Cl.$^6$ ....................................................... F02G 5/02
[52] U.S. Cl. .............................. 290/2; 237/8 D; 60/39.45; 60/685; 415/177
[58] Field of Search ........................ 290/2, 52; 237/12.1; 165/156; 60/39.45, 685; 415/177

[56] References Cited

U.S. PATENT DOCUMENTS

| | | | |
|---|---|---|---|
| 2,459,709 | 1/1949 | Lysholm | 290/2 |
| 3,418,485 | 12/1968 | Anderson et al. | 290/1 |
| 3,678,284 | 7/1972 | Peters | 290/1 |
| 4,434,613 | 3/1984 | Stahl | 60/39.07 |
| 4,474,007 | 10/1984 | Kronogård et al. | 60/605 |
| 4,495,901 | 1/1985 | Nannini et al. | 123/2 |
| 4,500,270 | 2/1985 | Tuckey | 418/133 |
| 4,503,337 | 3/1985 | Häfner et al. | 290/4 D |
| 4,736,111 | 4/1988 | Linden | 290/2 |
| 4,754,607 | 7/1988 | Mackay | 60/723 |

OTHER PUBLICATIONS

Shapiro, J., Positive Displacement Compressors, appearing in, Gas Turbine Principles and Practice, Cox, Sir H.R. ed. pp. 7–1–7–14, May 1955.
Saunders, O.A., et al., Heat Exchange and Heat Exchangers, appearing in, Gas Turbine Principles and Practice, Cox, Sir H. R. ed., pp. 21–1–21–21, May 1955.

Primary Examiner—Nestor Ramirez
Assistant Examiner—Nicholas Ponomarenko
Attorney, Agent, or Firm—Reising, Ethington, Learman & McCulloch, PLLC

[57] ABSTRACT

A combined heat and electricity generating unit is suitable for use in single family homes and the like. When it is operating it provides heat for heating the home and electricity for use by the electricity consuming devices in the home and the excess is available for sale to the power utility. It includes an air compressor, a fuel pump, a turbine driven by heated combustion products and an electric motor-generator for driving the fuel pump and air compressor and converting energy produced by the turbine to electricity. In an alternate embodiment the electric motor-generator is replaced by an electric motor and an electric generator. In the case where gaseous fuel is used the fuel pump may be a positive displacement gas compressor. The pressurized combustion products enable a particularly efficient and inexpensive heat exchanger. The air compressor maintains a slight vacuum in the housing thereby eliminating risk of combustion products escaping.

28 Claims, 2 Drawing Sheets

SMALL HEAT AND ELECTRICITY GENERATING PLANT

This application is a continuation-in-part of application Ser. No. 08/355,113 filed Dec. 13, 1994, now abandoned, which is a continuation of application Ser. No. 08/121,371 filed Sep. 14, 1993, now abandoned, which is a continuation of application Ser. No. 07/773,345 filed Oct. 7, 1991, now abandoned, which is a continuation-in-part of application Ser. No. 07/529,704 filed May 25, 1990, now abandoned, which is a file wrapper continuation of application Ser. No. 07/218,863 filed Jul. 14, 1988, now abandoned, for "Small Heat And Electricity Generating Plant".

FIELD OF THE INVENTION

This invention relates to combined heat and electricity generating plants for providing both heat for such as residential heating and electricity for powering such as domestic appliances and for selling to the electric utility.

BACKGROUND OF THE INVENTION

It is well known to locate electric power plants in close proximity to a facility requiring heat whereby the waste heat from the generation of electricity may be utilized with minimum transportation cost and minimum loss in the heat distribution system. Such cogeneration plants are commonly found in large facilities such as large buildings or complexes of buildings. They generate electricity for their own use and, at times when an excess is produced, the excess power is sold to the power utility for distribution to its other customers.

Heretofore such cogeneration plants have not been successfully applied in the single family home or small apartment building. The potential advantages resulting from generating electricity from even a small fraction of the fuel presently consumed for heating and supplying domestic hot water in small buildings are substantial. That fuel which is converted to electricity is converted at about one hundred percent efficiency in a well designed cogeneration plant whereas modern hydrocarbon burning central power generating stations may waste sixty five percent of the fuel burned. The reason there is no waste is because the cogeneration system of the invention operates only when heat is needed so none of the energy in the fuel is wasted. Central power plants and long distance distribution equipment also require very substantial capital investment.

Heretofore no combined power and heat generating plant has been successfully applied to heating such as single family residences. Many attempts have been made to adapt the designs that work well in larger sizes to the home but formidable problems have prevented commercial success. These attempts typically involve an internal combustion engine driving an electric generator with means to utilize the heat produced for space heating. One problem is that internal combustion engines generate noise levels that are difficult to insulate to the degree required at acceptable cost. Another problem is that much of the heat generated by an internal combustion engine is not easily applied to domestic heating. This is because heat from the engine coolant, heat from the engine exhaust, and heat from the exterior surface of the engine must be contained and transferred to where the heat is needed. This requires complex heat exchange apparatus which adds to the cost. Containing heat from the exterior surface of the engine is typically accomplished by insulating the engine which results in high temperatures which increases cost and reduces reliability. In domestic heating plants where heat is distributed as hot air the air to be heated cannot be in direct contact with the engine because this provides a noise conduit between the engine and the residential areas. U.S. Pat. No. 4,736,111, issued Apr. 5, 1988 to Linden teaches the making of a unit that minimizes heat radiation of the engine but the cost of doing so is significant and acoustic isolation and tight sealing are required. The prior art is more fully discussed in the aforementioned patent issued to Linden.

It is also known to use a hydrocarbon burning turbine as a prime mover. This solves a number of the aforementioned problems but known turbines are expensive. One contributor to that cost is the need to inject the correct amount of fuel into the combustor. Also, a low cost and highly efficient heat exchanger for removing heat from turbine exhaust requires a large pressure drop in the heat exchanger which requires a high pressure ratio in the compressor stage which is not easily achieved in small turbines.

Heretofore it has not been recognized that a highly efficient prime mover is not required for cogeneration plants used in small buildings. Further, it has not been heretofore recognized that low efficiency prime movers typically reduce or eliminate the aforementioned problems. Further, it has not been heretofore recognized that application of turbines to small cogeneration systems can be practicable when high efficiency is not important. Further, in the case of a turbine, if the compression is accomplished by a positive displacement pump and only the expansion is done in a turbine the problems of obtaining the correct fuel to air ratio are eliminated. Further, it has not been heretofore recognized that a prime mover comprising a positive displacement compressor in combination with a turbine expander has low noise when its exhaust is directed to a heat exchanger having a high pressure drop. Further, it has not been heretofore recognized that a prime mover comprising a positive displacement compressor and a positive displacement fuel pump inherently mixes the fuel and air in the proper proportions. Further, it has not been heretofore recognized that prime movers of low thermal efficiency operate at relatively low temperatures and have low internal stresses and are, therefore, low in cost and particularly suitable for domestic use. Finally, it has not been heretofore recognized that the turbines developed for the automotive industry for use in turbochargers provide a low cost and readily available means for converting pressurized combustion products to rotary motion in a domestic cogeneration system.

SUMMARY OF THE INVENTION

The present invention provides a cogeneration plant comprising a prime mover of low thermal efficiency which is inexpensive and not noisy in combination with an electric motor-generator that is superior to other known systems for domestic use.

Further, in accordance with this invention, the prime mover comprises a positive displacement compressor and a turbine expander.

Further, in accordance with this invention, the pressurization of the combustion products is used to force them through a heat exchanger which is lower in cost and smaller by virtue of the high pressure drop therein.

Further, in accordance with a second embodiment of this invention an electric motor drives a positive displacement air compressor and a turbine drives an electric generator.

Further, in accordance with an embodiment of this invention that uses gaseous hydrocarbon fuel two compressors are supplied, one for the air and one for the fuel whereby a correct fuel-air mixture is assured.

Further, in accordance with an embodiment of this invention, some or all of the mechanical components are enclosed in a sealed chamber which is maintained at less than atmospheric pressure whereby leakage into inhabited areas is prevented.

A complete understanding of this invention may be obtained from the description that follows taken with the accompanying drawings.

BEST MODE FOR CARRYING OUT THE INVENTION

Figure 1:
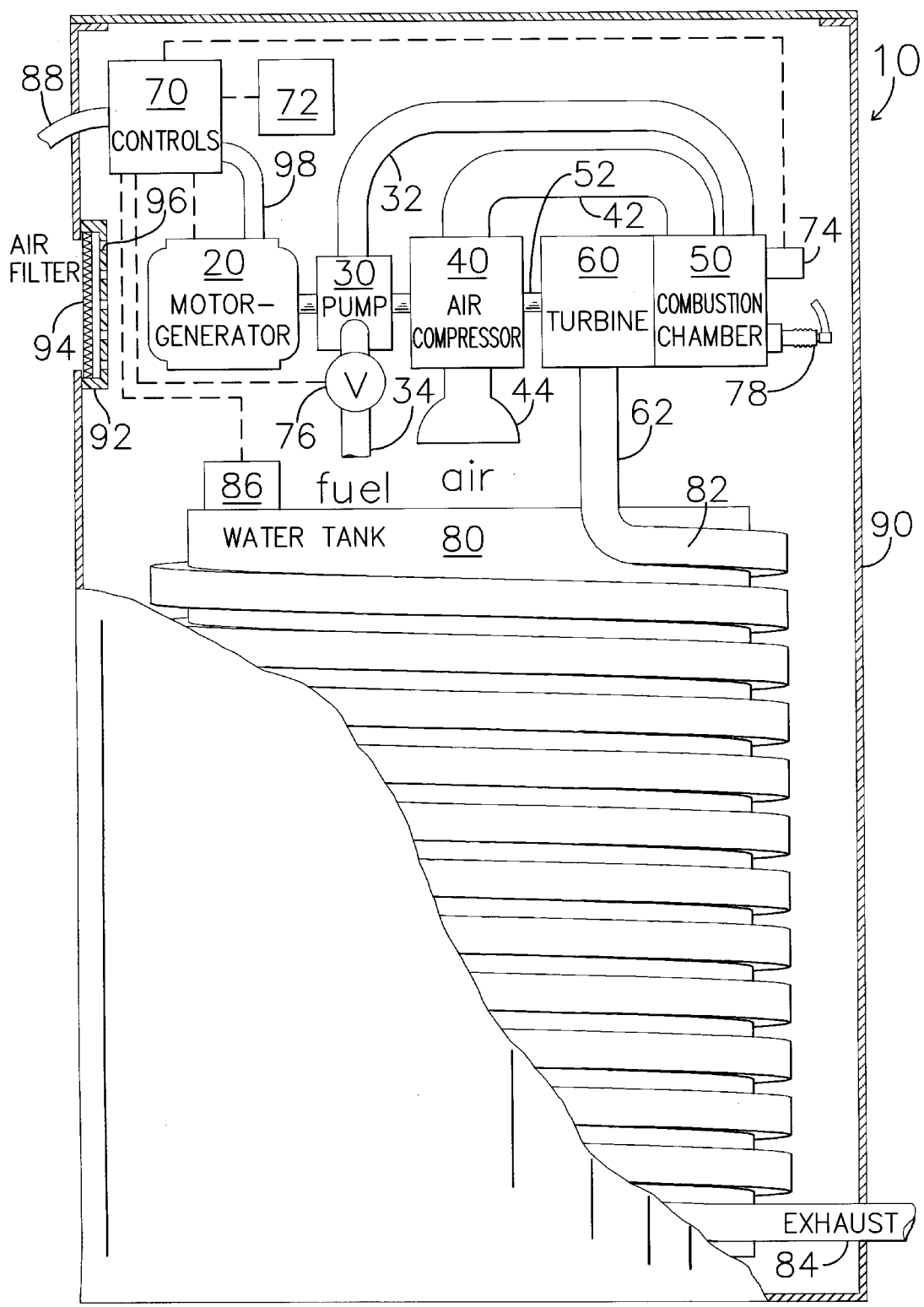
FIG. 1 shows a schematic diagram of the electricity generating and heat producing plant of the invention.

Referring now to the drawings, two illustrative embodiments of the invention are shown in water heating and electricity generating systems. Referring now to FIG. 1, the water heating and electricity generating system 10 comprises a motor-generator 20 for initial startup of the system and for generating electricity during operation, a fuel pump 30, a positive displacement air compressor 40 for providing pressurized fuel and air to the combustion chamber 50, and a turbine 60 for driving the air compressor 40, fuel pump 30, and motor-generator 20 through common shaft 52. A control 70 is responsive to the rate of rotation of motor-generator 20, the output of a differential pressure sensor 72, the output of a flame sensor 74, the output of a water temperature sensor 86, the voltage of the incoming electric power main supplied through conductor 88, and the power being generated by motor-generator 20 and supplied to the main through conductors 98 and 88. Control 70 controls motor-generator 20 to operate as a motor to initiate operation of the system and fuel valve 76 to admit fuel into fuel pump 30 for delivery to combustion chamber 50 when the rotation rate is sufficient for operation of the system.

Figure 2:
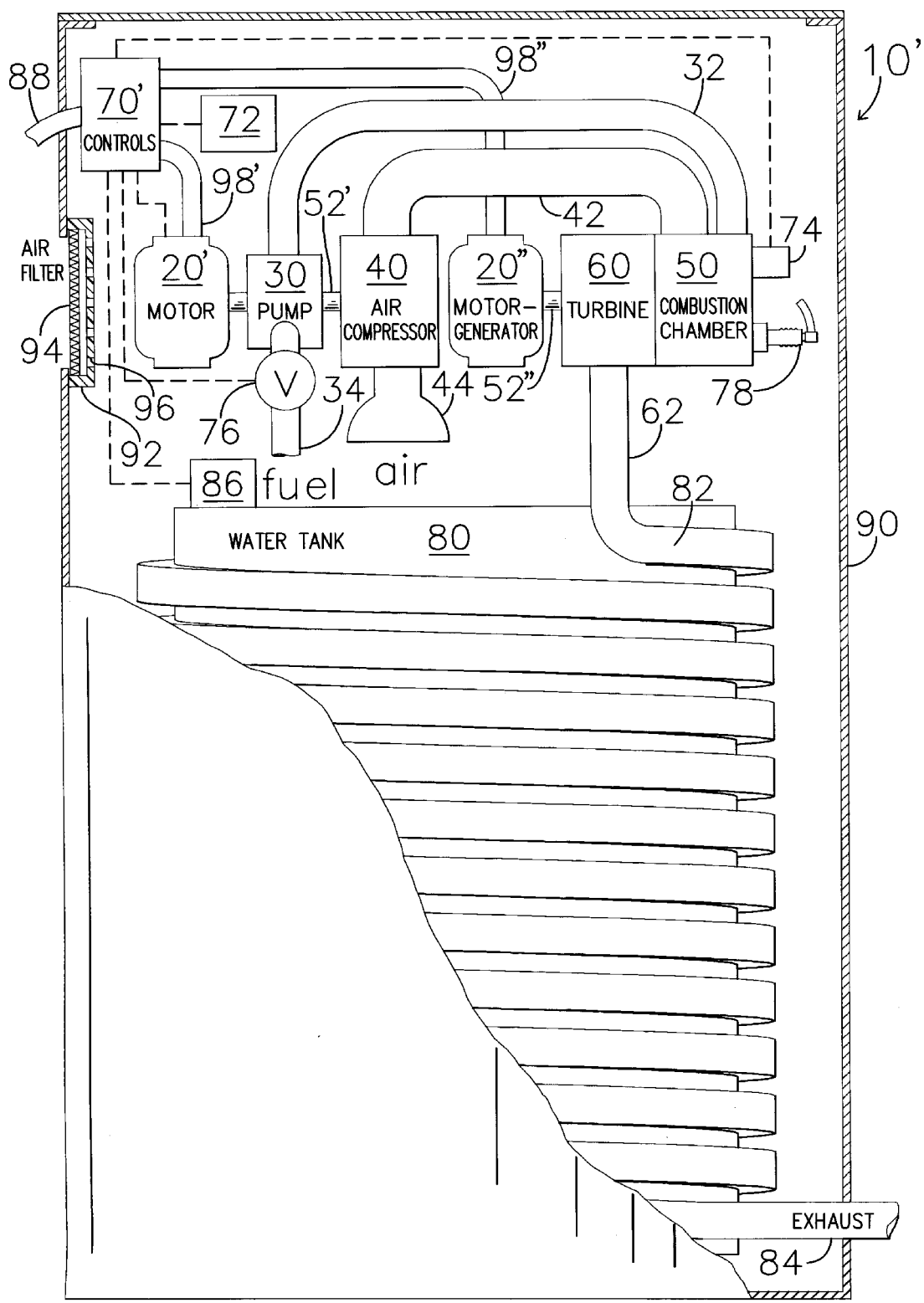
FIG. 2 shows a second embodiment of the invention which is similar to the embodiment illustrated in FIG. 1 except that a motor and a generator replace the single motor-generator illustrated in FIG. 1.

Referring now to FIG. 2, the water heating and electricity generating system 10' comprises an electric motor 20' for driving a fuel pump and air compressor, an electric generator 20" for generating electricity, a fuel pump 30 and a positive displacement air compressor 40 for providing pressurized fuel and air to the combustion chamber 50, and a turbine 60 for driving the electric generator 20" through shaft 52". A control 70' is responsive to the rate of rotation of generator 20", the output of a differential pressure sensor 72, the output of a flame sensor 74, the output of a water temperature sensor 86, the voltage of the incoming electric power main supplied through conductor 88, and the power being generated by generator 20" and supplied to the main through conductors 98" and 88. When operation is desired control 70 supplies power to motor 20' and controls fuel valve 76 to admit fuel into fuel pump 30 for delivery to combustion chamber 50.

It will be appreciated as the description proceeds that the invention may be implemented in different embodiments.

Referring now to FIG. 1, the water heating and electricity generating system 10 comprises a motor-generator 20 which can be any of many known designs. Two designs are particularly advantageous. The first preferred design comprises a conventional induction motor coupled with the turbine by a belt drive or speed changing gear set. This design has the disadvantage of requiring a speed changer but this disadvantage may be offset by the ability to use readily available low rpm fuel pumps and positive displacement air compressors as well as by the low cost and high reliability of induction motors. The second preferred motor-generator design is a high speed motor-generator with a permanently magnetized armature and electronic commutation of the stator coils. This design has the advantages of much smaller size and elimination of the speed changer.

The fuel pump 30 may be of any known design. For pumping liquid fuel when a low rpm power source is available any of the commercially available pumps for supplying fuel to domestic oil burners is suitable. For pumping gaseous fuel any positive displacement compressor is suitable. For simplicity the fuel pump for gaseous fuel is preferably a compressor of the same design as the positive displacement air compressor 40. If adequate means are provided to prevent combustion in fluid conduit 42 the fuel pump 30 may be eliminated and the gaseous fuel injected at constant low rate into the air inlet 44.

The positive displacement air compressor 40 may be any of the known positive displacement air compressors. It is adapted to take in air through inlet filter 44 and supply pressurized air to conduit 42. One preferred design is a compressor comprising three pistons driven by a common crank which is a design known to supply gas at a uniform rate and to be inexpensive and reliable. A second preferred air compressor design is a Roots blower. A third preferred air compressor design is a screw compressor.

The combustion chamber 50 may be of any conventional design appropriate to the fuel selected. The fuel is transported to the combustion chamber 50 by fluid conduit 32 and injected into the combustion chamber by known means appropriate to the fuel selected. The air compressed by positive displacement air compressor 40 is transported to the combustion chamber 50 by fluid conduit 42. Before entering the combustion chamber the air passes through channels (not illustrated) in the walls of the combustion chamber thereby cooling the chamber walls after which it is injected by known means to achieve optimum combustion. The walls of the combustion chamber in proximity to the flame may be insulated by a ceramic coating. Many such coatings are known. One preferred insulating coating is the coating developed by Cummings Engine Company for coating the tops of Diesel engine pistons. Flame sensor 74 senses the presence of a flame in combustion chamber 50 and provides a signal to control 70 informing it of the presence or absence of a flame. The ignitor 78 provides a continuous electric spark to initiate and maintain combustion. The ignitor and flame sensor may be of any known design.

The turbine 60 may be of any known design suitable for converting pressurized combustion products provided by combustion chamber 50 to mechanical energy. It is preferably of a design like the turbines used in automobile turbochargers. More specifically, it is preferred to use a turbine manufactured for use in an automobile the prime mover of the invention. These turbines have been highly developed to have a long life at flow rates, temperatures and pressures encountered in the turbine of the invention.

Hot combustion products exit the turbine 60 through conduit 62 and may be used for any purpose requiring hot gaseous combustion products. In the embodiment illustrated in FIG. 1 the hot combustion products are used to heat water in a tank 80 which might be the reservoir of the hot water heater of an apartment building or the reservoir of a home heating system of the circulating hot water type.

The hot combustion products flow from turbine exhaust conduit 62 through heat exchanger tubing 82 which is wrapped around and in intimate contact with water tank 80. After passing through the heat exchanger tubing the spent combustion products exit through exit conduit 84 and are vented by means not illustrated to the outdoors. The great length of the heat exchanger tubing 82 provides highly efficient transfer of heat from the combustion products to the water tank. This comprises a means for achieving high heat transfer with minimum use of material and minimum size. There is a significant pressure drop through the heat exchanger tubing 82 which reduces the efficiency of the turbine 60 but this is acceptable in the system of the invention because low efficiency is not a disadvantage and efficient use of the available heat and cost are primary concerns. The pressure drop increases if the cross section area of the heat exchanger tubing 82 reduced to reduce the cost and also increases if the length of the heat exchanger tubing 82 is increased to increase the efficiency of heat transfer from the combustion products to the water tank. Because turbine efficiency is a low priority the optimum design may have a pressure drop through the tubing 82 substantially greater than one pound per square inch.

The hot combustion products could equally well be used to heat a plenum for heating air in a hot air home heating system. Alternatively, the tubing 82 could be provided with heat dissipating fins of any convenient type known to those skilled in the art and directly used for heating air.

The entire assembly is placed inside housing 90. Air inlet 92 has a filter 94 for cleaning intake air and orifices 96 sized to maintain a small predetermined pressure difference between the outside and inside of housing 90 when the system is operating. Differential pressure sensor 72 senses the pressure differential between outside and inside housing 90. The presence of a certain pressure differential indicates that normal amounts of air are flowing through the air inlet and hence through the entire system and out the exit conduit 84. For more accurate determination of air flow a mass flow meter (not illustrated) might be placed at the air inlet. Control 70 monitors the output of water temperature sensor 86 that indicates the temperature of the water in water tank 80, the power being generated by motor-generator 20 as it is received through conductor 98, the speed of motor-generator 20, and the outputs of differential pressure sensor 72 and flame sensor 74. Control 70 controls fuel control valve 76 so that fuel is only admitted when the system is operating normally and heat is required.

Referring now to FIG. 2, the water heating and electricity generating system 10' comprises an electric motor 20' which is preferably a conventional induction motor. The low speed of an induction motor enables operation of fuel and air pumps without speed reduction. System 10' also comprises a generator 20" which is preferably a high speed electric generator adapted for being driven directly through shaft 52" by turbine 60.

The fuel pump 30, the positive displacement air compressor 40, the combustion chamber 50, turbine 60, flame sensor 74 and ignitor 78 may be of any of the designs described hereinabove with reference to FIG. 1.

The hot combustion products exit the turbine 60 through conduit 62 and may be used for any purpose requiring hot gaseous combustion products as described hereinabove with reference to FIG. 1.

The entire assembly is placed inside housing 90. Air inlet 92 has a filter 94 for cleaning intake air and orifices 96 sized to maintain a small predetermined pressure difference between the outside and inside of housing 90 when the system is operating. Differential pressure sensor 72 senses the pressure differential between outside and inside housing 90. The presence of a certain pressure differential indicates that normal amounts of air are flowing through the air inlet and hence through the entire system and out the exit conduit 84. For more accurate determination of air flow a mass flow meter (not illustrated) might be placed at the air inlet. Control 70' monitors the output of water temperature sensor 86 that indicates the temperature of the water in water tank 80, the speed of generator 20" and the power being generated as it is received through conductor 98, and the outputs of differential pressure sensor 72 and flame sensor 74. Control 70' controls fuel control valve 76 so that fuel is only admitted when the system is operating normally and heat is required.

The operation of the system of this invention will now be described with reference to FIG. 1. In operation of the system, when water temperature sensor 86 indicates that the water in tank 80 is below a desired temperature, control 70 initiates operation of the water heating and electricity generating system 10 by providing power to motor-generator 20. Motor-generator 20 thereupon functions as a motor to bring the shaft 52 and therefore the fuel pump 30, positive displacement air compressor 40, and turbine 60 up to operating speed. As the speed of positive displacement air compressor 40 approaches operating speed air is drawn in through inlet 92 and through intake filter 44 and pressurized so that it flows through combustion chamber 50, turbine 60, outlet 62, heat exchanger 82, and exit conduit 84. Upon determining that motor-generator 20 is rotating at operating speed and that differential pressure sensor 72 indicates an acceptable pressure differential, control 70 opens fuel control valve 76 which causes fuel to enter combustion chamber 50. After a delay appropriate for the fuel, control 70 begins requiring that flame sensor 74 indicate the presence of a flame. If a flame is not sensed when it should be operation of the system is stopped by control 70. Also, if at any time differential pressure sensor 72 indicates an incorrect pressure differential operation of the system is stopped by control 70. Also, if the voltage of the power main varies outside acceptable limits operation of the system is stopped by control 70. If all information indicates that operation is normal then control 70 continues directing operation of the system until water temperature sensor 86 indicates that the water in tank 80 has reached the desired temperature. When that happens control 70 turns off fuel valve 76 and operation of the system stops. During normal operation of the system motor-generator 20 is generating substantial amounts of electrical power which is supplied through conductor 98 and control 70 to the power main 88. This power is used by any electrical appliances in the home. If the total power required by the appliances is less than the power output of motor-generator 20 then the excess is supplied to the power utility.

The operation a second embodiment of the system of this invention will now be described with reference to FIG. 2. In operation of the system, when water temperature sensor 86 indicates that the water in tank 80 is below a desired temperature, control 70' initiates operation of the water heating and electricity generating system 10' by providing power to motor 20'. Motor 20' through shaft 52' drives fuel pump 30 and positive displacement air compressor 40 causing air to flow through inlet 92, intake filter 44, positive displacement air compressor 40, combustion chamber 50, turbine 60, outlet 62, heat exchanger 82, and exit conduit 84. When differential pressure sensor 72 indicates an acceptable pressure differential control 70' opens fuel control valve 76 and fuel enters combustion chamber 50. After a delay appropriate for the fuel, control 70' requires flame indication from flame sensor 74. If a flame is not sensed control 70' turns off fuel control valve 76 and motor 20' thereby stopping operation. If at any time differential pressure sensor 72 indicates an incorrect pressure differential operation is stopped by control 70'. If all information indicates that operation is normal then control 70' continues directing operation of the system until water temperature sensor 86 indicates that the water in tank 80 has reached the desired temperature. When the desired temperature is achieved control 70 turns off motor 20' and fuel valve 76 and operation stops. During normal operation of the system generator 20" is generating substantial amounts of electrical power which is supplied through conductor 98" and control 70' to the power main 88.

A substantial advantage of both embodiments described hereinabove of the invention is that they are acoustically quiet because all of the components when combined as described hereinabove are not noisy. More particularly, the three piston positive displacement air compressor referred to hereinabove is known to be low in noise emission when operated at moderate speeds and the air intake filter provides acoustic isolation. Balanced turbines are also inherently quiet except at their inlet and outlet. In the invention as described hereinabove the noise at the turbine inlet and the air compressor outlet is isolated by the air compressor and the turbine. Also, the noise at the turbine outlet is acoustically diminished by the long length and small diameter of the heat exchanger. Further, if the cogeneration system of the invention is located in a container for thermal insulation and safety purposes as described hereinabove the container additionally functions to reduce sound emissions. Therefore the cogeneration system described hereinabove can be installed in such as single family residences without additional elements solely dedicated to sound absorption. By comparison, other low cost cogeneration plants are unacceptable without sound insulation means such as being surrounded by sound transmission barriers or sound absorbers having no function related to the purposes of the cogeneration plant and being present only for reduction of sound emissions. A particular example of a cogeneration plant that is not suitable for installation in a single family residence comprises a Diesel or Otto cycle engine located in a room surrounded by sound insulation. This is not suitable because it requires a large amount of space and to be effective expensive sound insulation is required. Another example is a cogeneration plant comprising a Diesel or Otto cycle engine where thermal insulation is applied directly to the engine and exhaust components. This exemplary design is not suitable for single family residences because high temperature insulating elements don't adequately reduce the inherently high noise levels both because materials suitable for high temperature thermal insulation are inferior noise absorbers and because the much higher initial noise levels cannot be adequately diminished by the amounts of thermal insulating materials required for thermal insulation.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A cogeneration system comprising:
    a turbine having a turbine inlet and a turbine outlet,
    an electric generator coupled with said turbine for driving thereby,
    a positive displacement compressor for pressurizing air and having an air inlet for admitting air for pressurization and an air outlet for issuing pressurized air,
    means for driving said positive displacement compressor,
    combustion means for burning fuel and said pressurized air for generating pressurized combustion products,
    said turbine inlet being coupled with said combustion means for receiving said pressurized combustion products whereby said turbine converts energy contained in said pressurized combustion products to mechanical energy for driving said generator and discharges reduced energy combustion products at said turbine outlet, and a heat exchanger coupled with said turbine outlet for receiving said reduced energy combustion products and exchanging heat contained therein,
    said heat exchanged being of a quantity appropriate for heating a single family residence.

2. The invention as defined by claim 1 including:
    a second positive displacement compressor, and wherein:
        said fuel is a gaseous fuel and is pressurized by said second positive displacement compressor prior to said combining.

3. The invention as defined by claim 1 wherein:
    said electric generator is a motor-generator.

4. The invention as defined by claim 1 wherein said compressor is a three piston positive displacement air compressor.

5. The invention as defined by claim 1 wherein:
    said cogeneration system is installed in a container and said container is evacuated to a lower pressure than the pressure outside the container by removal of air for supplying said combustion and wherein said lowered pressure is monitored for indication of proper operation.

6. The invention as defined by claim 1 wherein:
    said means for driving said positive displacement compressor is an electric motor distinct from said generator.

7. The invention as defined by claim 1 wherein:
    said turbine has the structure of a turbine in a turbocharger adapted for use in the exhaust of an internal combustion engine.

8. The invention as defined in claim 1 wherein:
    said cogeneration system is installed in a container,
    whereby the noise outside said container from operation of said cogeneration system is reduced to a level acceptable in a single family residence.

9. The invention as defined in claim 1 including:
    said conduit of said heat exchanger providing a heat transfer flow path for the combustion products received from said turbine outlet, said flow path being long enough to produce a pressure drop in said conduit greater than one pound per square inch.

10. A cogeneration system comprising a turbine in driving engagement with an electric generator,
    said turbine having an inlet for admission of pressurized combustion products and having an outlet for discharge of reduced energy combustion products whereby said turbine converts energy contained in said pressurized combustion products to mechanical energy,
    a heat exchanger including a conduit having an inlet connected with said turbine outlet and an outlet communicating with the atmosphere, and
    said heat exchanger causing said combustion products to undergo a pressure drop in said conduit greater than one pound per square inch.

11. The invention as defined in claim 10 wherein:
said electric generator is a motor-generator.

12. The invention as defined in claim 10 wherein:
fuel and compressed air are mixed and burned to generate said combustion products, and
said air is compressed by a positive displacement air compressor prior to combustion.

13. The invention as defined in claim 10 wherein:
said cogeneration system is installed in a container and said container is evacuated to a lower pressure than the pressure outside the container by removal of air for supplying said combustion and wherein said lowered pressure is monitored for indication of proper operation.

14. The invention as defined in claim 10 wherein:
said cogeneration system comprises a fuel pump and said fuel pump is a positive displacement pump.

15. The invention as defined in claim 10 wherein:
said turbine has the structure of a turbine in a turbocharger adapted for use in the exhaust of an internal combustion engine.

16. The invention as defined in claim 10 wherein:
said conduit is of such length and cross-section that the flow of said combustion products therethrough is sufficient for said turbine to drive said generator at a predetermined speed when it is under load, and
said pressure drop in said conduit is high enough for optimized heat transfer by said heat exchanger.

17. The invention as defined in claim 10 wherein:
said pressure drop between said turbine inlet and said turbine outlet is sufficient for said turbine to drive said generator at a predetermined speed when it is under load, and
said pressure drop in said heat exchanger is high enough for optimized heat transfer by said heat exchanger.

18. A cogeneration system comprising:
a container,
combustion means within said container for generating combustion products,
means for withdrawing air from said container for supplying said combustion means,
an air flow path including flow restricting means extending from outside said container to inside said container for replenishing air withdrawn from said container,
said flow restricting means causing said container to be evacuated by withdrawing of air to a pressure differentially below the pressure of the air surrounding the container,
and means for monitoring said pressure differential for normal operation of said cogeneration system.

19. The invention as defined in claim 18 wherein:
said cogeneration system comprising a turbine having a turbine inlet and a turbine outlet and said turbine being adapted for driving engagement with an electric generator,
said turbine inlet being adapted for admission of pressurized combustion products and said turbine being adapted to convert energy contained in said pressurized combustion products to mechanical energy and to exhaust combustion products at said turbine outlet,
a heat exchanger including a conduit,
said turbine outlet being coupled with said conduit for delivery thereto exhaust from said turbine.

20. A cogeneration system comprising:
a turbine having a turbine inlet and a turbine outlet,
an electric generator coupled with said turbine for driving thereby,
a positive displacement compressor having an air inlet and an air outlet for producing pressurized air,
means for driving said positive displacement compressor,
combustion means for combining fuel and said pressurized air from said air outlet and burning the combination thereof for generating pressurized combustion products,
means for admitting said pressurized combustion products to said turbine inlet,
said turbine converting energy contained in said pressurized combustion products to mechanical energy for driving said generator and discharging reduced energy combustion products at said turbine outlet,
a heat exchanger including a conduit having a heat exchanger inlet coupled with said turbine outlet,
said heat exchanger exchanging a quantity of heat appropriate for heating a single family residence, and
wherein said positive displacement compressor comprises a piston sealingly movable in a cylinder, said piston having an intake stroke for drawing air into said cylinder through said air inlet and a compression stroke for driving said air from said cylinder through said air outlet.

21. In combination,
a building of approximately the size of a single family residence,
a cogeneration system in said small building, said cogeneration system comprising:
a turbine having a turbine inlet and a turbine outlet,
an electric generator coupled with said turbine for driving thereby,
a positive displacement compressor having an air inlet and an air outlet for producing pressurized air,
means for driving said positive displacement compressor,
combustion means for combining fuel and said pressurized air from said air outlet and burning the combination thereof for generating pressurized combustion products,
means for admitting said pressurized combustion products to said turbine inlet
said turbine converting energy contained in said pressurized combustion products to mechanical energy for driving said generator and discharging reduced energy combustion products containing sufficient heat for heating said building at said turbine outlet, and
a heat exchanger including a conduit having a heat exchanger inlet coupled with said turbine outlet.

22. A cogeneration system for heating a small building such as a single family residence comprising:
a turbine of small size having a turbine inlet and a turbine outlet,
an electric generator coupled with said turbine for driving thereby,
a positive displacement compressor for pressurizing air and having an air inlet for admitting air for pressurization and an air outlet for issuing pressurized air,
means for driving said positive displacement compressor,
combustion means for burning fuel and said pressurized air for generating pressurized combustion products, said turbine inlet being coupled with said combustion means for receiving said pressurized combustion products whereby said turbine converts energy contained in said pressurized combustion products to mechanical energy for driving said generator and discharges deenergized combustion products at said turbine outlet, a heat exchanger coupled with said turbine outlet for receiving said deenergized combustion products and exchanging heat contained therein, said turbine and said heat exchanger being of such size that the amount of heat contained in said deenergized combustion products is approximately that required for heating a single family residence, said heat exchanger comprising a conduit having one end coupled with said turbine outlet for receiving combustion products and another end communicating with the atmosphere for discharging combustion products into the atmosphere, said conduit of said heat exchanger providing a heat transfer flow path for the combustion products received from said turbine outlet, said flow path being long enough to produce a pressure drop in said conduit greater than one pound per square inch.

23. A cogeneration system for use in a small building such as a single family residence comprising:

a turbine of small size having a turbine inlet and a turbine outlet, an electric generator coupled with said turbine for driving thereby, a positive displacement compressor having an air inlet and an air outlet for producing pressurized air, means for driving said positive displacement compressor, combustion means for combining fuel and said pressurized air from said air outlet and burning the combination thereof for generating pressurized combustion products, and means for admission of said pressurized combustion products to said turbine inlet for converting energy contained in said pressurized combustion products to mechanical energy for driving said generator and for exhausting combustion products at said turbine outlet, a second positive displacement compressor wherein said fuel is a gaseous fuel and is pressurized by said second positive displacement compressor prior to said combining.

24. A cogeneration system for use in a small building such as a single family residence comprising:

a turbine of small size having a turbine inlet and a turbine outlet, an electric generator coupled with said turbine for driving thereby, a positive displacement compressor having an air inlet and an air outlet for producing pressurized air, means for driving said positive displacement compressor, combustion means for combining fuel and said pressurized air from said air outlet and burning the combination thereof for generating pressurized combustion products, and means for admission of said pressurized combustion products to said turbine inlet for converting energy contained in said pressurized combustion products to mechanical energy for driving said generator and for exhausting combustion products at said turbine outlet, wherein said compressor is a three piston positive displacement air compressor.

25. A cogeneration system for producing heat and electricity in amounts meeting the needs for heat and electricity of a building of the size of a single family residence comprising:

a prime mover that produces hot exhaust gases and a heat exchanger including a conduit having one end adapted for receipt of said hot exhaust gases and another end communicating with the atmosphere, said heat exchanger containing a minimum amount of material and utilizing a higher conduit pressure drop than conventional heat exchangers to achieve high heat transfer during passage of said hot exhaust gases through said conduit, and said prime mover being optimized for operation at low thermal efficiency, whereby components of said prime mover operate at lower temperatures and stresses than corresponding components of commercially available prime movers whereby said system has low initial cost and produces relatively less electricity and relatively more heat than known cogeneration systems.

26. The invention as defined by claim 25 wherein:

said conduit pressure drop is greater than one pound per square inch.

27. A cogeneration system for producing heat and electricity in amounts meeting the needs for heat and electricity of a building of the size of a single family residence comprising:

a prime mover that produces hot exhaust gases and a heat exchanger including a conduit having one end adapted for receipt of said hot exhaust gases and another end communicating with the atmosphere, said prime mover being optimized for operation at low thermal efficiency, whereby components of said prime mover operate at lower temperatures and stresses than corresponding components of commercially available prime movers whereby said system has low initial cost and produces relatively less electricity and relatively more heat than known cogeneration systems.

28. The invention as defined in claim 27 wherein:

said heat exchanger containing a minimum amount of material and utilizing a higher conduit pressure drop than conventional heat exchangers to achieve high heat transfer during passage of said hot exhaust gases through said conduit, and said conduit pressure drop is greater than one pound per square inch.

* * * * *